US 9,767,461 B2

(12) United States Patent
Clancy, Jr. et al.

(10) Patent No.: US 9,767,461 B2
(45) Date of Patent: Sep. 19, 2017

(54) TARGETED IN-GROUP ADVERTISING

(75) Inventors: Maurice Lee Clancy, Jr., San Francisco, CA (US); Bryan Joseph Schroeder, San Jose, CA (US); Gordon Maurice Strause, San Mateo, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 2005 days.

(21) Appl. No.: 11/854,074

(22) Filed: Sep. 12, 2007

(65) Prior Publication Data
US 2009/0070204 A1 Mar. 12, 2009

(51) Int. Cl.
*G06Q 30/00* (2012.01)
*G06Q 99/00* (2006.01)
*G06Q 30/02* (2012.01)

(52) U.S. Cl.
CPC ......... *G06Q 30/02* (2013.01); *G06Q 30/0264* (2013.01)

(58) Field of Classification Search
USPC .......................................................... 705/14
See application file for complete search history.

(56) References Cited

U.S. PATENT DOCUMENTS

| 6,625,595 | B1 * | 9/2003 | Anderson | G06F 17/3061 |
| 7,363,247 | B1 * | 4/2008 | Barnhill, Jr. | G06Q 30/06 705/26.4 |
| 7,590,723 | B2 * | 9/2009 | Mager | G06Q 30/02 705/14.49 |
| 8,402,094 | B2 * | 3/2013 | Bosworth | G06Q 30/08 705/319 |
| 2002/0099605 | A1 * | 7/2002 | Weitzman | G06Q 30/02 705/14.35 |
| 2002/0161838 | A1 * | 10/2002 | Pickover | G06Q 30/02 709/204 |
| 2003/0036944 | A1 * | 2/2003 | Lesandrini | G06Q 30/02 705/7.32 |
| 2004/0039579 | A1 * | 2/2004 | Chithambaram | G06Q 50/01 705/319 |

(Continued)

OTHER PUBLICATIONS

Turpin et al. U.S. Appl. No. 60/898,808 (Turpin-Prov.).*

*Primary Examiner* — Matthew T Sittner
(74) *Attorney, Agent, or Firm* — Martine Penilla Group, LLP

(57) ABSTRACT

Embodiments of the present invention fill the need of displaying relevant advertisements to members of targeted online groups (or online community groups), whose group members share common interests. The relevant advertisements are provided by advertisers who promote goods and/or services that the targeted online groups are likely to have an interest. The advertisers choose the targeted online groups based on the description of the common interests, focus or background of the online groups, or based on the categories that the online groups are associated. In one embodiment, moderators of the online groups may screen the advertisements before they are displayed on the online group media spaces. By matching interests, focus or background of online groups with products and/or serviced promoted by the advertisers and by moderators screening advertisements, the advertisements displayed would be more likely to be relevant to the members of the online groups.

21 Claims, 16 Drawing Sheets

(56) References Cited

U.S. PATENT DOCUMENTS

| | | | |
|---|---|---|---|
| 2004/0157119 A1* | 8/2004 | Muchin | B65D 85/70 429/149 |
| 2005/0004840 A1* | 1/2005 | Wanninger | G06Q 30/02 705/14.64 |
| 2005/0010475 A1* | 1/2005 | Perkowski | G06Q 30/02 705/14.51 |
| 2005/0021415 A1* | 1/2005 | Desai | G06Q 30/06 705/26.8 |
| 2005/0038687 A1* | 2/2005 | Galdes | G06Q 10/107 709/206 |
| 2005/0144024 A1* | 6/2005 | Wojton et al. | 705/1 |
| 2005/0149397 A1* | 7/2005 | Morgenstern | G06Q 30/02 705/14.52 |
| 2005/0197846 A1* | 9/2005 | Pezaris | G06Q 10/0637 705/319 |
| 2005/0216346 A1* | 9/2005 | Kusumoto | G06Q 30/02 705/14.12 |
| 2006/0104600 A1* | 5/2006 | Abrams | H04N 5/247 386/223 |
| 2006/0155597 A1* | 7/2006 | Gleason | 705/14 |
| 2006/0235873 A1* | 10/2006 | Thomas | G06F 17/30867 |
| 2007/0021973 A1* | 1/2007 | Stremler | 705/1 |
| 2007/0043617 A1* | 2/2007 | Stein | G06Q 30/0267 705/14.64 |
| 2007/0179792 A1* | 8/2007 | Kramer | G06Q 30/02 705/1.1 |
| 2007/0220575 A1* | 9/2007 | Cooper et al. | 725/118 |
| 2007/0282621 A1* | 12/2007 | Altman | G06Q 10/10 705/319 |
| 2007/0282675 A1* | 12/2007 | Varghese | G06Q 30/02 705/14.1 |
| 2008/0005231 A1* | 1/2008 | Kelley | G06Q 30/02 709/203 |
| 2008/0010343 A1* | 1/2008 | Escaffi | G06Q 10/00 709/204 |
| 2008/0046257 A1* | 2/2008 | Sarno | G06Q 50/01 705/319 |
| 2008/0059308 A1* | 3/2008 | Gerken | G06Q 30/02 705/14.44 |
| 2008/0103879 A1* | 5/2008 | Armstrong | 705/10 |
| 2008/0140506 A1* | 6/2008 | Christianson | G06Q 30/02 705/14.44 |
| 2008/0147487 A1* | 6/2008 | Hirshberg | 705/10 |
| 2008/0162260 A1* | 7/2008 | Rohan et al. | 705/10 |
| 2008/0201311 A1* | 8/2008 | Ertugrul | G06F 17/30867 |
| 2008/0235078 A1* | 9/2008 | Hong | G06Q 30/0256 705/14.54 |
| 2008/0249863 A1* | 10/2008 | Redmond | G06Q 10/10 705/14.27 |
| 2008/0281622 A1* | 11/2008 | Hoal | G06Q 30/02 705/319 |
| 2008/0281710 A1* | 11/2008 | Hoal | G06Q 30/02 705/14.39 |
| 2008/0281711 A1* | 11/2008 | Bridges | G06Q 30/02 705/14.27 |
| 2008/0282324 A1* | 11/2008 | Hoal | G06Q 30/02 726/3 |
| 2008/0300905 A1* | 12/2008 | Kelley, III | G06Q 50/20 705/1.1 |
| 2008/0300990 A1* | 12/2008 | Guiton | G06Q 30/02 705/14.21 |
| 2008/0313011 A1* | 12/2008 | Rose | G06Q 30/02 705/7.32 |
| 2008/0319823 A1* | 12/2008 | Ahn | G06Q 30/02 705/51 |
| 2009/0037267 A1* | 2/2009 | Duggal | G06Q 30/02 705/14.48 |
| 2009/0063284 A1* | 3/2009 | Turpin et al. | 705/14 |
| 2009/0070204 A1* | 3/2009 | Clancy, Jr. | G06Q 30/0264 705/14.61 |
| 2009/0070219 A1* | 3/2009 | D'Angelo et al. | 705/14 |
| 2010/0057536 A1* | 3/2010 | Stefik | G06F 17/2785 705/14.71 |

* cited by examiner

Select Groups to place Advertisements — 123

Type in Group Name — 141
[_____]

OR

[Choose Groups From Selected Online Groups] — 142

[Done] — 143

Advertiser – A — 124
Placing Requirements

[+] — 145

Selected Online Groups for Ad — 144

| | Total Members |
|---|---|
| 1. ABC EE Alumni: | 300 |
| 2. DEF EE Alumni: | 400 |
| 3. GHI EE Alumni: | 350 |

Available Advertisement(s) — 146

| | | Type |
|---|---|---|
| ☑ Ad – 1 | EE Jobs in Bay Area, CA | Link |
| ☐ Ad – 2 | EE Jobs in Los Angeles | Link |
| ☐ Ad – 3 | EE Jobs in Boston Area | Link |
| ••• | | |

— 152

Duration / Start Date / End Date — 147

☑ 17 Days   [MM/DD/YY] — 148   [MM/DD/YY] — 149
☐ 14 Days
•••

[Check Price] — 150

View Ratings and Comments of Advertisements — 148

[Pay] — 151

FIG. 3F

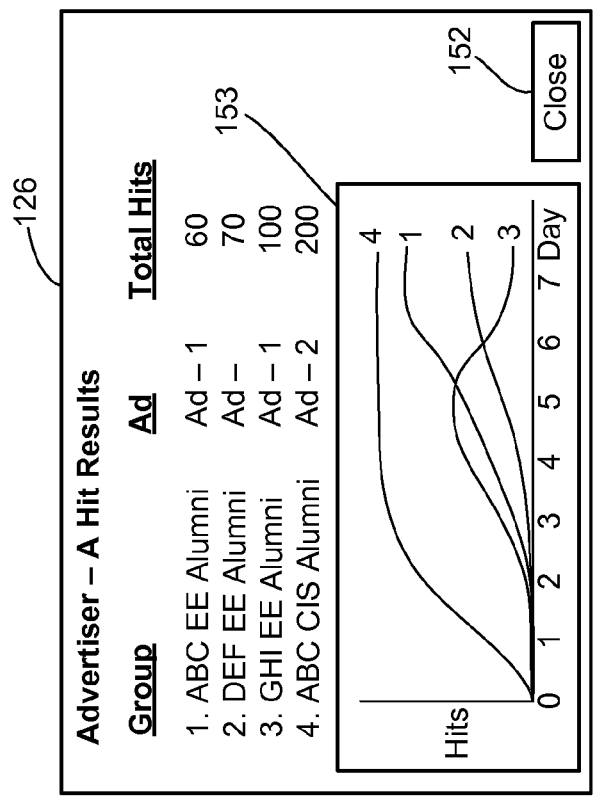

Advertisement Management
ABC – EE Alumni

Advertisement to be Approved

| | Approve | Reject | Ad | Advertiser | Start Date | End Date | Duration |
|---|---|---|---|---|---|---|---|
| 1. | ☑ 162 | ☐ | Ad-1 | Advertiser-A | xxxxxx | xxxxxx | 7days |
| 2. | ☑ 163 | ☐ | Ad-A | Advertiser-B | xxxxxx | xxxxxx | 14days |
| 3. | ☐ | ☑ | Ad-B | Advertiser-C | xxxxxx | xxxxxx | 7days |

Approved Advertisements and advertisers        164        Rejected Advertisements and Advertisers

Allowed Subjects
1. Jobs
2. Train       173
[       ] Allowed

Disallowed Subjects
1. Personals
2. Cars       174
[       ] Disallowed

Ad Space Management

Location                    Size
☐ Top  ☐ Bottom            ☐ Large  ☐ Medium  ☐ Small

Profit from Advertisements

Ad         Profit
Ad-1      $3.00

View Rating and Comments of Advertisements

Done

FIG. 4B

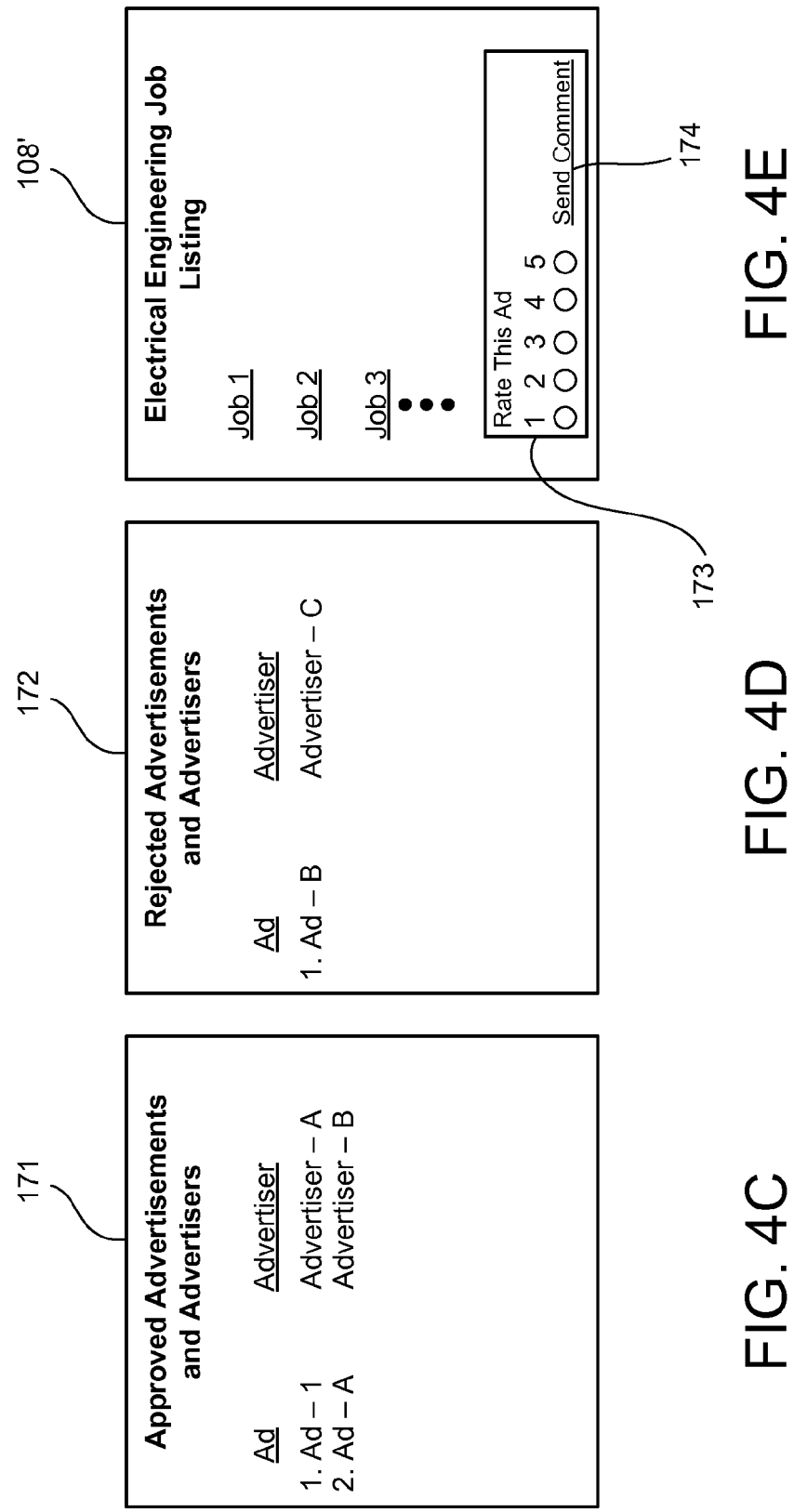

TARGETED IN-GROUP ADVERTISING

BACKGROUND OF THE INVENTION

1. Field of the Invention

This invention relates generally to the displaying of advertisements in an on-line community group media space, and more particularly, selecting on-line community groups, by advertisers, to display advertisements in the on-line community group media spaces for members of the selected (or targeted) on-line community groups.

2. Description of the Related Art

On-line advertising may be used to accomplish various business goals, ranging from building brand awareness among potential customers to facilitating on-line purchases of products and/or services. A number of different kinds of page-based or video-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. Some Internet technologies enable rich video advertisements.

However, most on-line advertisements are not effective in reaching on-line users because the advertisers have no knowledge or only very limited knowledge regarding the receiving users. Advertisers often can only target advertisements based on a vague understanding of the demographics of users viewing certain media spaces or web pages. Therefore, most of on-line advertisement is either not targeted at all, or not targeted effectively. Since on-line advertisements are presented to the users with little or no knowledge of who the users are, the chance that certain on-line users will be interested in a specific advertisement is small. Therefore, many on-line users simply choose to ignore a majority of on-line advertisements.

It is in this context that embodiments of the present invention arise.

SUMMARY OF THE INVENTION

Broadly speaking, the present invention fills the need of displaying relevant advertisements to members of targeted online groups (or online community groups), whose group members share common interests. The relevant advertisements are provided by advertisers who promote goods and/or services that the targeted online groups are likely to have an interest. The advertisers choose the targeted online groups based on the description of the common interests, focus or background of the online groups, or based on the categories that the online groups are associated. In one embodiment, moderators of the online groups may screen the advertisements before they are displayed on the online group media spaces (or web sites). Screening by moderators further verifies the relevancy of the advertisements to the targeted online groups and verifies if the online groups welcome the specific advertisements. By matching interests, focus or background of online groups with products and/or services promoted by the advertisers and by screening advertisements, by the moderators of the online groups, the advertisements displayed would be more likely to be relevant to the members of the online groups. Therefore, the members of the targeted online groups are more likely to view the advertisement, which achieves the goal of the advertisers to have their advertisement viewed by users.

It should be appreciated that the present invention can be implemented in numerous ways, including as a method, a system, or a device. Several inventive embodiments of the present invention are described below.

In one embodiment, a method of providing an advertisement for display in an advertisement space of an online group is provided. The method includes enabling selection of the online group from a plurality of online groups by an advertiser. The goods or services promoted by the advertiser in the advertisement correlate to a focus of the online group. The method also includes receiving a request to display the advertisement in the advertisement space of the online group from the advertiser. The method further includes enabling review of the request to display the advertisement by a moderator of the online group to determine whether to allow the advertisement to be displayed in the advertisement space of the online group. In addition, the method includes displaying the advertisement in the advertisement space of the online group if the moderator determines to allow the advertisement to be displayed, and not displaying the advertisement if the moderator determines not to allow the advertisement to be displayed.

In another embodiment, an advertisement system for displaying advertisements provided by advertisers to online groups of an online group system is provided. The system includes an advertiser unit. The advertiser unit collects inputs, analyzes inputs, and interacts with other units in the advertisement system to prepare responses to requests from the advertisers. The advertisers select online groups whose group focus matches the products or services promoted by the advertisements provided the advertisers. The advertisers place requests to display the advertisements on media spaces of the selected online groups. The system also includes a moderator unit. The moderator unit collects inputs, analyzes inputs, and interacts with other units in the advertisement system to prepare responses to requests from the moderators of the online groups. The moderators after reviewing the requests to display the advertisements placed by the advertisers decide whether to allow the advertisements to be displayed in the online groups that they moderate.

In yet another embodiment, computer readable media including program instructions for providing an advertisement for display in an advertisement space of an online group are provided. The computer readable media include program instructions for enabling selection of the online group from a plurality of online groups by an advertiser. The goods or services promoted by the advertiser in the advertisement match the focus of the online group. The computer readable media also include program instructions for receiving a request to display the advertisement in the advertisement space of the online group from the advertiser. The computer readable media further include program instructions for enabling review of the request to display the advertisement by a moderator of the online group to determine whether to allow the advertisement to be displayed in the advertisement space of the online group. In addition, the computer readable media include program instructions for displaying the advertisement in the advertisement space of the online group if the moderator determines to allow the advertisement to be displayed, and not displaying the advertisement if the moderator determines not to allow the advertisement to be displayed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 3E shows an online group selection window for an advertiser, in accordance with one embodiment of the present invention.

FIG. 3F shows a window of placing advertisements for an advertiser, in accordance with one embodiment of the present invention.

FIG. 3G shows a window of payment required to place advertisements by an advertiser, in accordance with one embodiment of the present invention.

FIG. 3H shows a window of hit results, in accordance with one embodiment of the present invention.

FIG. 3I shows a window of payment history, in accordance with one embodiment of the present invention.

FIG. 4B shows a window for managing advertisements on an online group, in accordance with one embodiment of the present invention.

FIG. 4C illustrates a window showing a list of approved advertisements and advertisers of an online group, in accordance with one embodiment of the present invention.

FIG. 4D illustrates a window showing a list of rejected advertisements and advertisers of an online group, in accordance with one embodiment of the present invention.

FIG. 4E shows an advertisement space including advertisement rating and comment functions, in accordance with one embodiment of the present invention.

DETAILED DESCRIPTION

The various embodiments of the present invention provide systems and methods for advertisers to select online groups (or online community groups) to display advertisements in their group media spaces. Members of such online groups have common interests, focus, or background. Such online groups, whose common focus, such as interests and background, provide advertisers information regarding the types of products and services that the members of the online groups would be interested in, are chosen by advertisers who promote goods and services through advertisements. Advertisers choose relevant online groups to display their advertisements in the media spaces of the chosen groups. Since the advertisements provided by the advertisers best match the interests, the focus or the background of the chosen online groups, members of these online groups are more likely to view the displayed advertisements.

Existing systems and methods for online advertisements focus on delivering advertisements to a wide audience, for example people interested in coffee. Millions of people drink coffee and are interested in coffee related products or services. However, there are merchants who sell products and/or services to smaller groups of people, such as a group of people having a special kind of pet dog, e.g., with members of about 1000 people. A merchant selling specialty dog food would thus be interested in delivering advertisements to such specific online group. Another example of such small online group is a group focusing on a rare disease. For example, such an online group could have membership of about 500 to 2000 people. A pharmaceutical company that has developed a new drug to treat such a rare disease would be interested in delivering an advertisement to such a group to inform members of the group of the availability of such new drug and/or recruit participants for clinical trials.

Currently, there are various online groups formed on various online social networking sites. For Example, YAHOO!® GROUPS currently has roughly 8.5 million groups with about 106 million engaged users. These online groups are listed under 29,000 different topic categories. Yahoo online groups are formed by members with common interests.

Figure 1A:
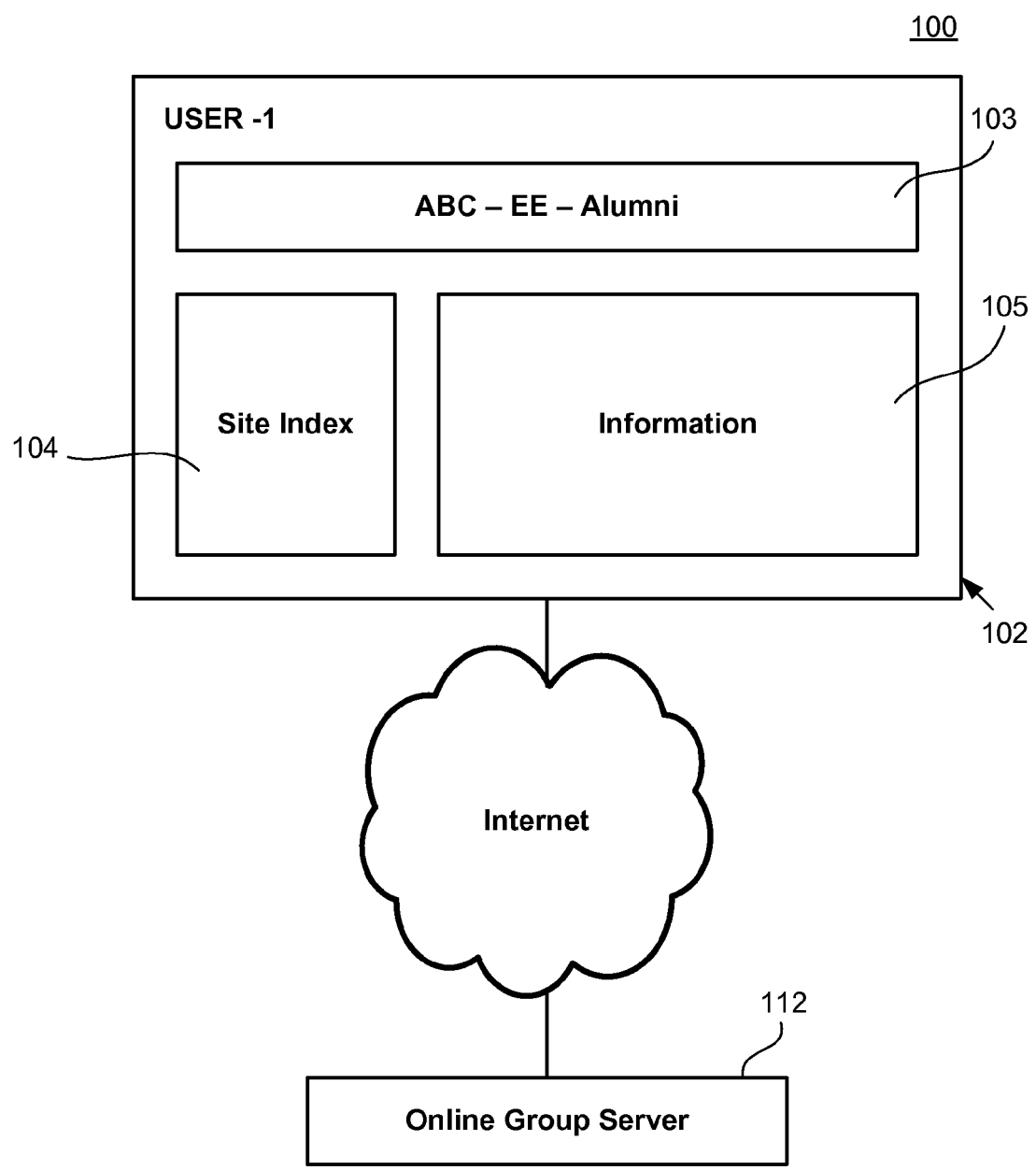
FIG. 1A shows a diagram illustrating an online group system operating over the Internet, in accordance with one embodiment of the present invention.

FIG. 1A shows a diagram illustrating an online group system 100 operating over the Internet, in accordance with one embodiment of the present invention. An online group client creates an online group user window 102 of USER-1 on a client computer of USER-1. The online group user window 102 of USER-1 is a graphical user interface of a media space (or web site) for the online group. An online group server 112 is also connected to the Internet to interact with the online group user window 102 of USER-1. In various online group systems, the online group servers may perform different functions such as receiving messages and files and transferring them, storing messages and files and displaying them on media spaces (or web sites) of online groups, etc.

Some online groups are open to public to view, while other online groups are private. Public online groups could be listed under different categories for general population to browse and view. Private online groups only allow members of the groups to view the contents of the media spaces of their groups. In one embodiment, online group user window 102 of USER-1 includes a group name field 103 containing the name of the online group. The exemplary online group in FIG. 1A has a group name "ABC-EE-Alumni". The online group is formed for alumni of Electrical Engineering Department of a fictitious ABC University. The online group user window 102 of USER-1 includes a site index field 104 containing index for the media space (or web site) of the online group. The online group user window 102 of USER-1 also includes an information field 105 containing information related to the site corresponding a site index in the site index field 104 being selected.

Figure 1B:
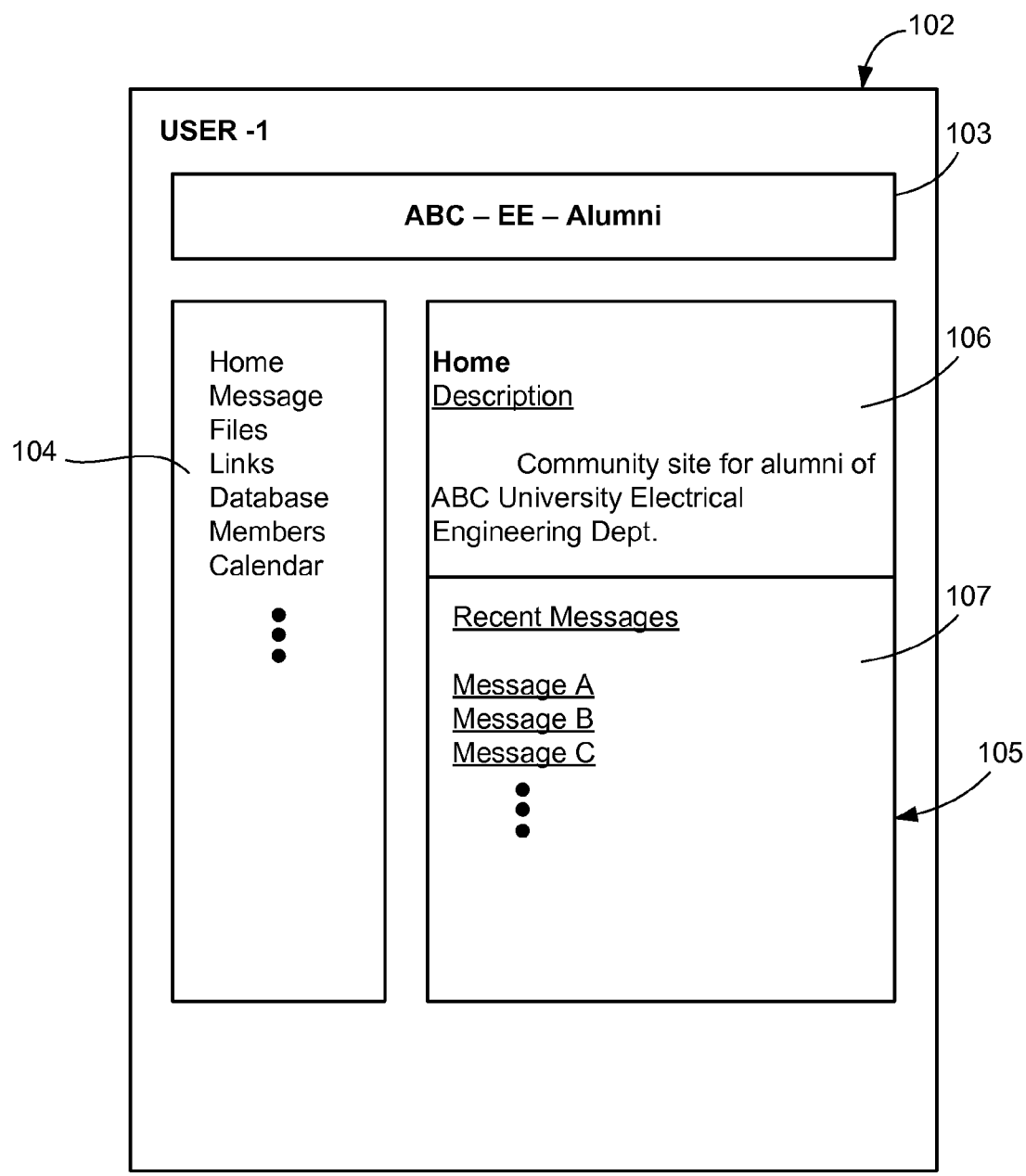
FIG. 1B shows a web page of an online group of a user, in accordance with one embodiment of the present invention.

As shown in FIG. 1B, the site index field 104 could include indexes of subjects, such as "Home", "Message", "Files", "Links", "Database", "Members", and "Calendar", which when clicked link to various contents. The contents of a particular index (of subject) being selected by clicking are shown in the information field 105. For example, if the index in the site index field 104 being clicked is "Home", then the information included in the information field 105 would be contents of the "Home" page of the online group. In the example shown in FIG. 1B, the information field 104 includes a group focus description 106 and a list of recent messages 107. Group focus description 106 provides information regarding the common interest, focus, and possibly background of the group members. Sometimes, the focus descriptions reveal the common background of the group members. For example, the description field 106 of FIG. 1B reveals that the members are alumni of ABC University with EE background. Other information can also be listed in information field 105, in addition to the group focus description 106 and the list of recent messages 107. Similarly if a different index, such as "Message" or "Members", in the site index field 104 is selected (e.g. by clicking), different information related to the selected index will be shown in the information field 105.

As the mentioned above, online groups are formed and used by members with common focus, interests, or background to exchange information and to stay connected. Online users are more likely to view advertisements that target their particular interests, focus or background. As mentioned above, group focus description 106 provides information regarding the common interests, focus, or background of the group members. In addition, public online groups are listed under various categories. The category that a particular online group is listed under also provides information regarding the group. For example, the exemplary "ABC-EE-Alumni" online group could be listed under a category related to "School and Education", which also includes "University" as a category. "ABC-EE-Alumni" could be further listed under the "ABC University" category, which is under the "University" category. From the category tree that the group is listed under, advertisers can get an idea that the members are educated with a college degree with electrical engineering (EE) background.

Figure 2A:
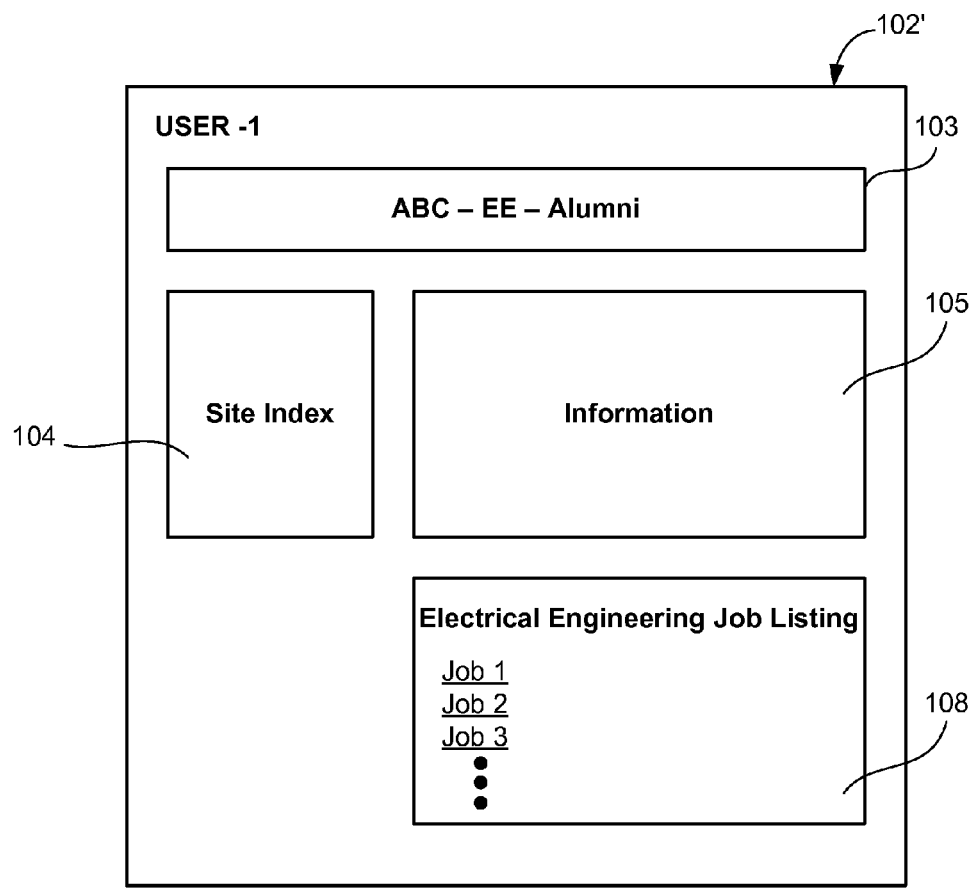
FIG. 2A shows a web page of an online group with an advertisement field of a user, in accordance with one embodiment of the present invention.

Advertisers, such as a job listing company, interested in providing products and services, such as job listing in the EE field, to the members of online group would likely find a more interested audience in the members of the groups than they would sending out a broad listing of jobs to a general population (untargeted). A majority of online users choose to ignore advertisements not relevant to their interests. In contrast, members of the online group, such as "ABC-EE-Alumni", would likely view an advertisement, such as a job listing in EE field, because the advertisement is relevant to them. In one embodiment, the EE job listing is listed in an advertisement space 108 of the online group user window 102' of USER-1, as shown in FIG. 2A. When a member of the online group, such as USER-1, accesses the media space of the online group, the member would see the EE job listing in the advertisement space 108. The job listing could include hyperlinks to "Job 1", "Job 2", and "Job 3", etc. The member can decide whether to view the content of the job listing or not. The job listing with hyperlinks shown in FIG. 2A is merely an example. Other forms of advertisement, such as an image, a video, etc., can also be used.

Members of "ABC-EE-Alumni" might view the job listing because the members are currently looking for new career opportunities or the members might know people in EE field who are seeking jobs. In addition, the members might view the job listings to gain knowledge on current job markets. Relevant advertisements delivered to targeted groups are much more effective than conventional online advertisement by blanketing a large population.

Figure 2B:
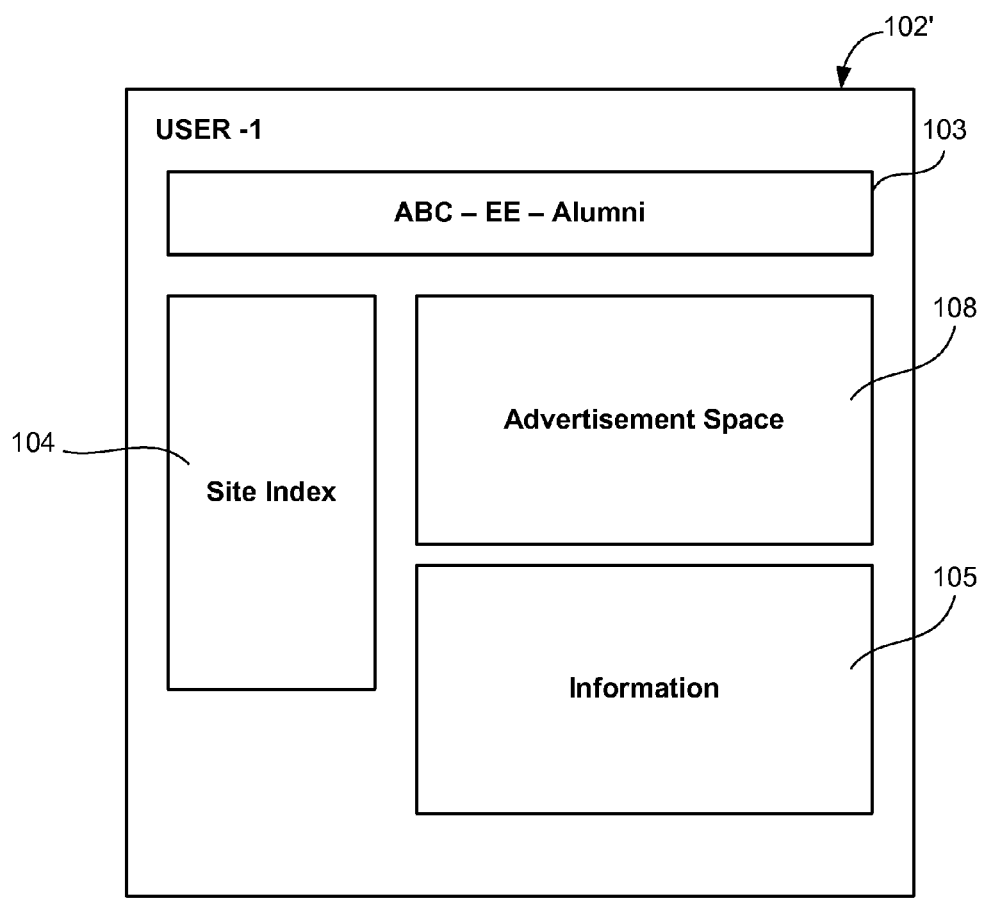
FIG. 2B shows a web page of an online group with an advertisement field of a user, in accordance with another embodiment of the present invention.

The embodiment of FIG. 2A shows that the advertisement space 108 is placed below the information window 105. However, the advertisement space 108 can be placed in any location in the media space (or web site) of the online group, including in the email messages delivered to all group members. For example, the advertisement space 108 can be placed above the information window 105, as shown in FIG. 2B.

Figure 2C:
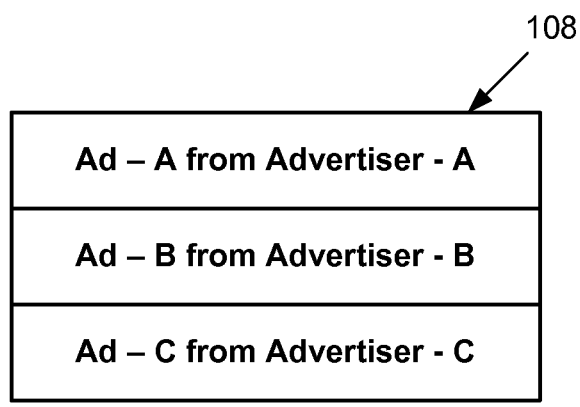
FIG. 2C shows an advertisement space with a number of advertisements, in accordance with one embodiment of the present invention.
Figure 2D:
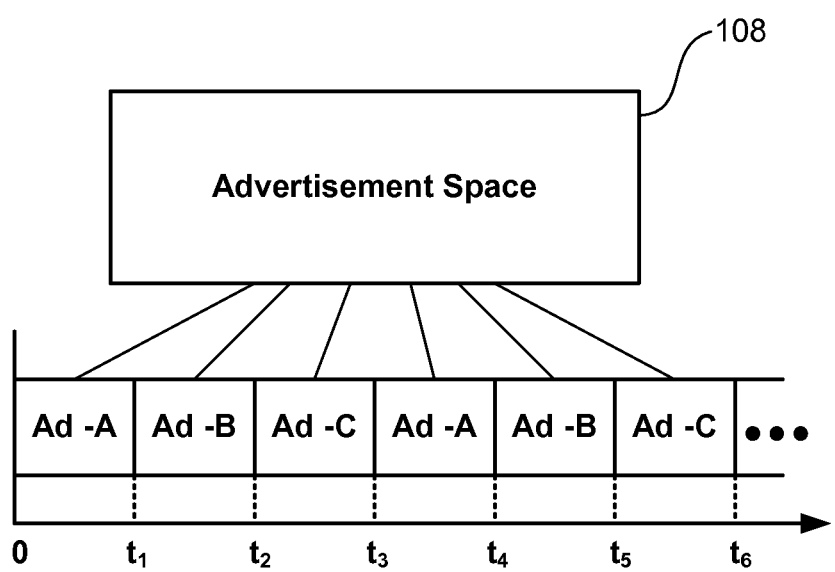
FIG. 2D shows an advertisement space configured to display a number of advertisements, in accordance with one embodiment of the present invention.

If multiple advertisers places advertisements on the online group, multiple advertisements can be displayed in the advertisement space 108, as shown in FIG. 2C, or be displayed sequentially one a time in the advertisement space 108, as shown in FIG. 2D. In FIG. 2C, three advertisements, Ad-A, Ad-B, and Ad-C, from three advertisers, Advertiser-A, Advertiser-B, and Advertiser-C, are shown together in the advertisement space 108. In FIG. 2D, three advertisements, Ad-A, Ad-B, and Ad-C, from three advertisers, Advertiser-A, Advertiser-B, and Advertiser-C, are shown sequentially in the advertisement space 108 one after another. Between time zero to $t_1$, Ad-A is shown. Between time $t_1$ to $t_2$, Ad-B is shown. Between time $t_2$ to $t_3$, Ad-C is shown. After all three advertisements are shown, the advertisement display rotates back to Ad-A again, then Ad-B, and followed by Ad-C. The process repeats continuously until the end of the display time of one or more of the advertisements, Ad-A, Ad-B, and Ad-C.

In one embodiment, advertisers place advertisements shown on the online group media space (web site) directly. Advertisers choose online groups to place advertisements on the online group media spaces. Advertisers also provide the advertisements to be shown on the online group media spaces. The advertisements are loaded into the system containing the online group media spaces by the advertisers. As described above, the advertisements can be simple links for users to click. The advertisements can contain images with text descriptions of the products and/or services being advertised. Other forms of advertisements, such as a video or a game, can also be used. Any type of advertisements created and used in online web pages can be used.

Online group moderator(s) play a key role in the display of the advertisements in the advertisement space 108 of the online group user window 102. Online group moderator(s) monitors and controls the content of the online group. An online group can have one or more moderators. The online group moderator can be an owner of the online group, who creates the online group. For example, an online group moderator(s) decides who is qualified to be a group member. If one of the group members exchanges information, such as posting messages or pictures, with members of the group in an unacceptable manner, the online group moderator can remove the unacceptable information from the site, put the offending member on individual moderation to monitor that member's future posts, and can even ban the member from the online group. Since advertisements displayed in an online group website are contents viewable to the group members, the moderator of the online group can accept or reject advertising requests from advertisers in order to control the content of the website. The moderator can decide if the contents of requested advertisements from the advertisers are appropriate, if the contents of the advertisements are relevant to the group. In one embodiment, an online group moderator(s) decides whether to accept advertisements from advertisers or not and what types of advertisements to accept or to reject.

Figure 3A:
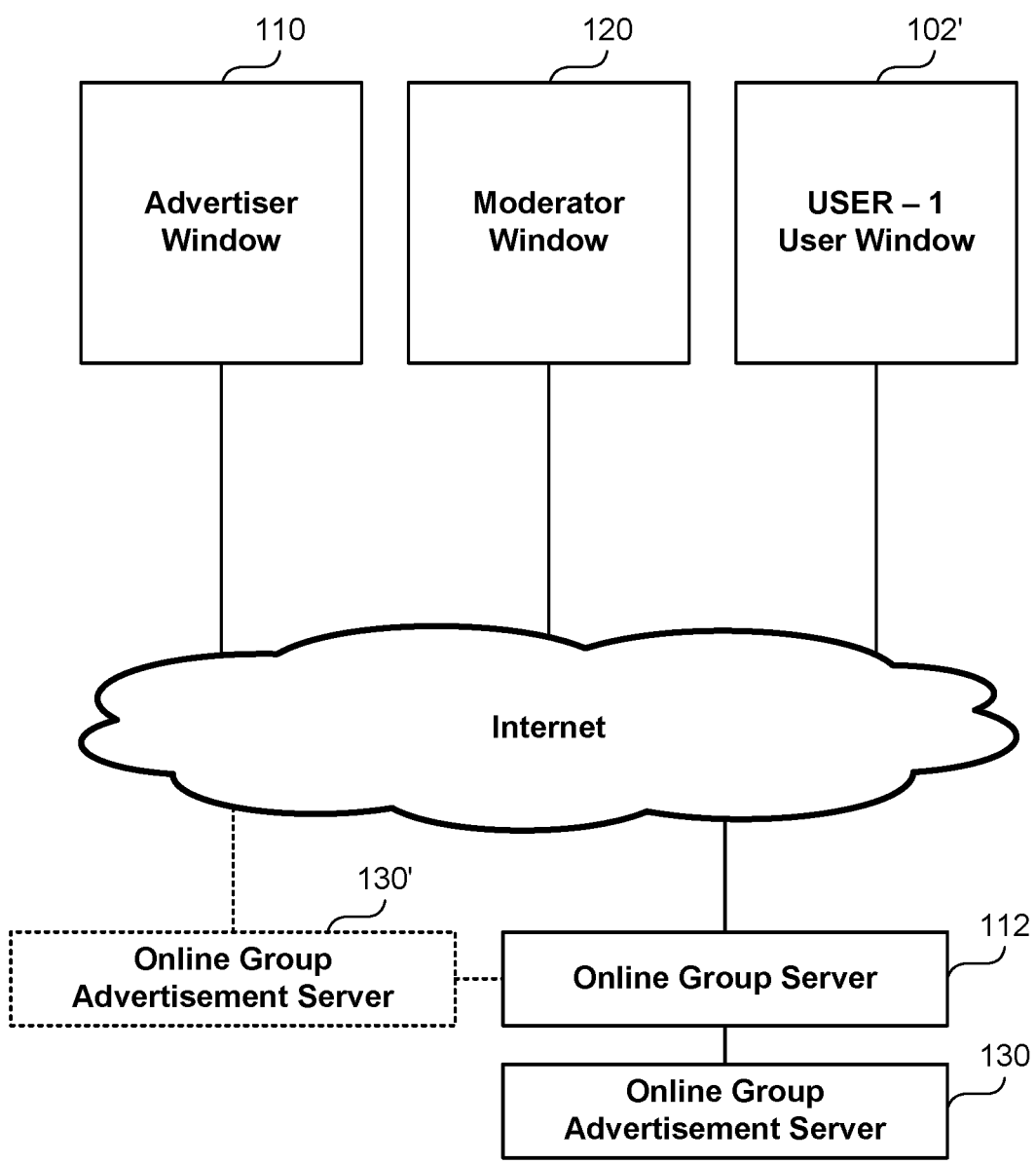
FIG. 3A shows a diagram illustrating an online group system operating over the Internet, in accordance with one embodiment of the present invention.

FIG. 3A shows a diagram illustrating an online group system 300 operating over the Internet, in accordance with one embodiment of the present invention. The online group system has an online group client creating an online group user window 102' of USER-1 of an online group, such as "ABC-EE-Alumni", on a client computer. System 300 also has an advertiser window 110 of an Advertiser-A on a client computer. System 300 further has a moderator window 120 of a moderator of the online group, such as "ABC-EE-Alumni", on a client computer. The online group user window 102', the advertiser window 110 of the Advertiser-A, and the moderator window 120 of the moderator access the online group server 112 through the Internet.

In the example shown in FIG. 3A, USER-1 and the moderator, who moderates "ABC-EE-Alumni", are both members of the "ABC-EE-Alumni" group. In another embodiment, a moderator of a group is not a member of the group. For example, the moderator could be a system administrator (or a customer care agent) assigned to moderate contents and/or activities of online groups in the online group system. Advertiser-A is interested in placing advertisement(s) in online groups. Advertiser-A can search online groups for descriptions of online groups to find online groups whose members would need products and/or services offered by the company that sponsors the advertisement provided by Advertiser-A. Advertiser-A can be a representative from the company or a representative from an advertising company hired by the company with goods and/or services. In the embodiment shown in FIG. 3A, Advertiser-A provides listing service of EE jobs and is interesting in posting EE jobs on media spaces of online groups whose members have EE background.

In one embodiment, an online group advertisement server 130 is coupled to the online group server 112. The online group advertisement server 130 has databases that store advertisements provided by various advertisers for various online groups. Advertisements can be of different formats, such as simple hyperlinks, images with text, videos, and games, etc. In addition, the online group advertisement server 130 stores information regarding pricing information for various factors, such as the types of advertisements, advertising duration, time of the advertisement, and advertising priority, etc. The cost of advertisements can vary with the formats of the advertisements. An advertisement could be displayed for a week, two weeks, a month, or longer. The duration of the advertisement being displayed could also affect the cost of the advertisement. Alternatively, the cost can be based on the number of impressions purchased or presented to the users.

In addition, the time the advertisement being displayed is also a factor that could affect the cost of the advertisement. For example, many advertisers like to display advertisement between Thanksgiving and New Year to promote holiday-related goods and/or services. If an advertiser chooses to display an advertisement during this period, the cost of the advertisement could be more than regular time. In addition, if there are a number of advertisements being displayed in an online group media spaces, such as the one shown in FIG. 3A, Advertiser-A might need to pay more than Advertiser-B and Advertiser-C, since the location of Ad-A is at the top of the advertisement space 108, which is the most prominent position of the advertisement space 108. The various factors mentioned above are merely examples, other factors, such as size of advertisement space, can also affect the pricing.

Alternatively, the online group advertisement server, such as online group advertisement server 130', can interact with users directly through Internet, instead of interacting indirectly with users through online group server 112.

The advertiser window 110 of the Advertiser-A, and the moderator window 120 of moderator of "ABC-EE-Alumni" online group can both access the online group advertisement server 130 through the Internet. Advertiser-A accesses the online group advertisement server 130 through the advertiser window 110 to place advertisements and the moderator accesses the online group advertisement server 130 to manage advertisements and other contents for the online group.

Figure 3B:
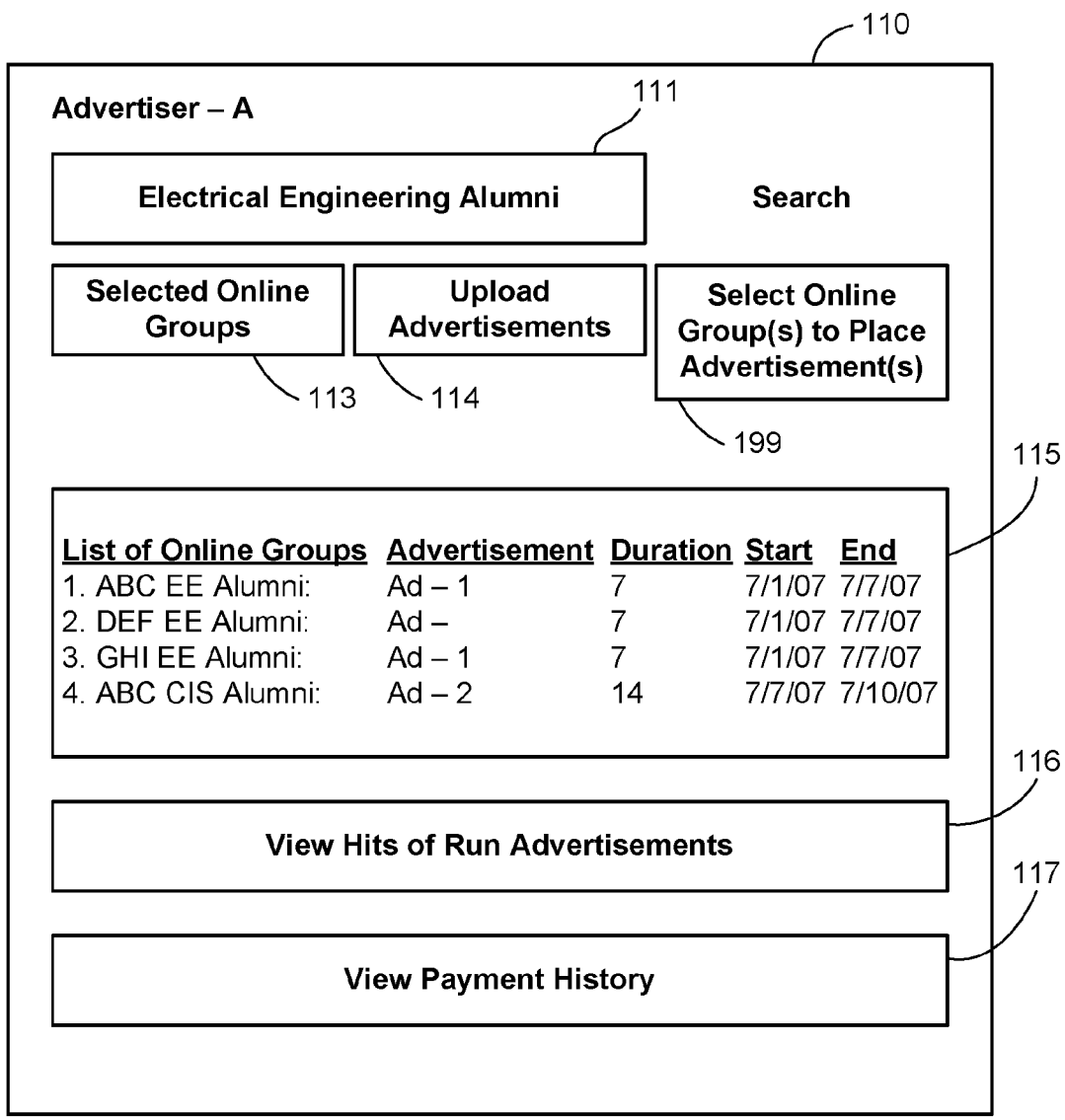
FIG. 3B shows an advertiser window of an advertiser, in accordance with one embodiment of the present invention.
Figure 3C:
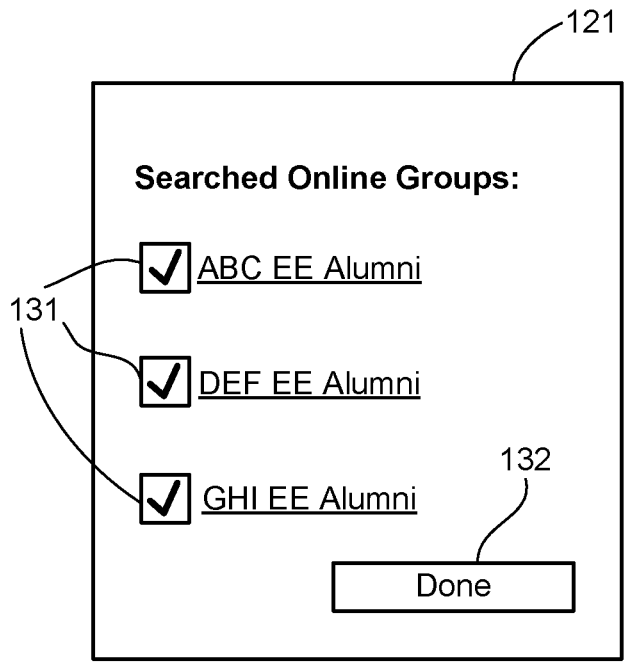
FIG. 3C shows a search result window, in accordance with one embodiment of the present invention.

FIG. 3B shows an advertiser window 110 of Advertiser-A, in accordance with one embodiment of the present invention. In the advertiser window 110, there is a search field 111, which allows Advertiser-A to enter a search term, such as "electrical engineering alumni". When Advertiser-A enters the term and presses the return key, a search result window 121, as shown in FIG. 3C, appears on the computer screen. In search result window 121, a list of online groups which have listed the terms: "electrical", "engineering" and "alumni" on the description fields 106 (see FIG. 1B) of their media spaces are shown. In the example shown in FIG. 3C, the search results shows a list of online groups, such as "ABC-EE-Alumni", "DEF-EE-Alumni", and "GHI-EE-Alumni", which are associated with "electrical engineering alumni". Advertiser-A can click on the hyperlinks of a group to view the content of the group to gain knowledge of the group, such as how many members the group has, etc. In addition, in front of each online group in the search result window 121, there could be selection boxes 131, which allow Advertiser-A to select an individual online group to add to a selected online group list of Advertiser-A or to select all matching online groups to add to an online group list of Advertiser-A. In the example shown in FIG. 3C, all three online groups are selected. After selections are made, Advertiser-A clicks on the "Done" button 132 to close the search result window 121. Alternatively, search result window 121 can be closed by clicking on the "Done" button 132 without making any selection.

Figure 3D:
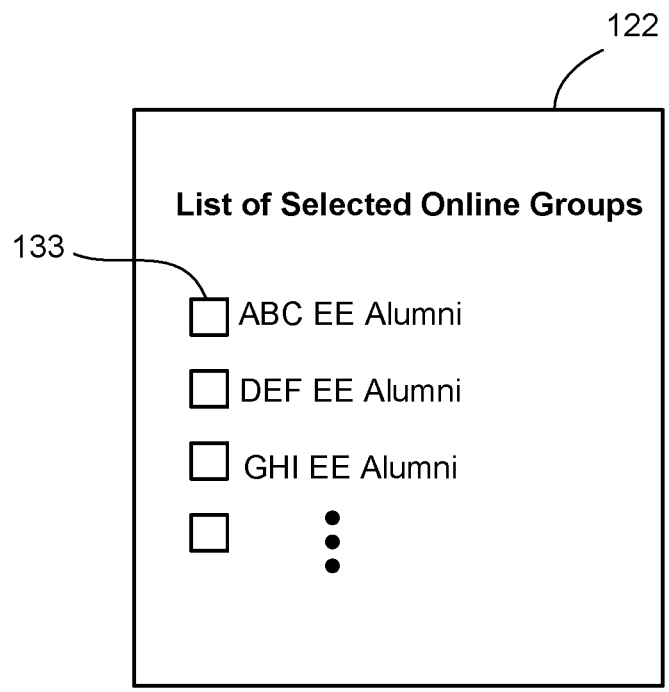
FIG. 3D shows a list of online groups that an advertiser has selected, in accordance with one embodiment of the present invention.

The online groups selected by Advertiser-A are stored and can be retrieved by clicking on button 113 of selected online groups in FIG. 3B. When Advertiser-A clicks on button 113 of selected groups, a list of online groups selected by Advertiser-A would appear, as shown in FIG. 3D. FIG. 3D shows a window 122 showing a list of online groups that Advertiser-A considers relevant and has selected. In front of each group, there is a box 133 for selecting the particular group for placing advertisement(s). In one embodiment, there is an interface (not shown) to select all groups in a given category or for a given search query term.

Advertiser window 110 of Advertiser-A also contains a button 199 to select group(s) to place advertisement(s). When Advertiser-A click on button 112 clicks on button 199, a selection window 123, as shown in FIG. 3E, appears. Advertiser-A can type in online group name in field 141 to add the group or by clicking on button 142 to choose a group from selected online groups of Advertiser-A, which has been shown in FIG. 3D. Box(es) 133 shown in FIG. 3D can be checked to select a group(s). When all selections are done, a "Done" button 143 can be pressed to close window 123. After the "Done" button 143 is pressed, a window 124 for placing advertisements for Advertiser-A is created, as shown in FIG. 3F. In window 124, there is a field 144 of selected online groups for placing an advertisement. The selections made in window 123 earlier are shown in field 144. In one embodiment, the numbers of the members of the online groups are shown in field 144. Advertiser-A can use "add" button 145 to select additional online group to add to the list shown in field 144.

Going back to FIG. 3B, Advertiser-A uses button 114 to upload advertisements. Existing methods used in uploading advertisement files can be used. Details are not described. The uploaded advertisement files are shown in field 146 in FIG. 3F. In the example shown in FIG. 3F, a few advertisements are listed in field 146. "Ad-1" is an advertisement of EE jobs in bay area, California. "Ad-1" would appear as a hyperlink and a text message describing the job content would appear after a user, such as USER-1, clicks on the hyperlink. "Ad-2" and "Ad-3" are both job listings of EE jobs in different areas of United States. Additional advertisements that are offered by Advertiser-A can be listed in field 146. In front of each advertisement in field 146, there is a selection box 152, which can be clicked by Advertiser-A to select for displaying advertisements to the online groups shown in field 144 of selected online groups. In the example shown in FIG. 3F, Advertiser-A chooses "Ad-1".

After the advertisement has been selected, the duration, start date, and end date to run "Ad-1" are selected or entered in field 147, in accordance with one embodiment of the present invention. In the example shown in FIG. 3F, Advertiser-A chooses to run "Ad-1" for 7 days. The start date and end date could be entered by typing in month(s), date(s) and year(s), such as Jul. 1, 2007 as start end and Jul. 7, 2007 as end date. Other methods of entering or selecting the duration, start date, and end date can also be used. After the online groups are selected, as shown in field 144, the advertisement has been selected, as shown in field 146, the duration, the start date, and end dates are selected, as shown in field 147, a "check price" button 150 is clicked to check the cost of running "Ad-1" to the selected groups shown in field 144. A window 125 showing the cost would appear after button 150 is clicked. Window 125 includes selected online groups, the total number of members of each group, duration, start date, end date and the total cost. As mentioned above, the cost of running an advertisement is affected by many factors, such as type of advertisement, duration of running the advertisement, the time of the year running the advertisement, the number of online groups, and the size of the online groups. In addition, the location where the advertisement would appear in the media space also can affect the cost. Further, the priority of the advertisements in relation to other advertisement can also affect the cost, as explained above in FIG. 2C.

After checking the price, Advertiser-A can choose to push the "Pay" button 151 or take other actions, such as editing the groups, advertisements, duration, start date, end date, or to close window 124 to make choices at a later time. Any method of payment, such as online payment by credit cards or by PayPal®, can be used. Details of how the payment is made are not explained here. The advertisement placement method shown in FIG. 3F is merely an example. Other methods or sequence of making the selections can also be used. After the payment is made, window 124 can be closed. Alternatively, payment for the advertisement can be made after the advertisement has been displayed in the online group. Window 124 has another button 148 for viewing ratings and comments of advertisements, which would be explained in details below.

The advertisements and online groups that Advertiser-A has chosen are shown in a field 115 of list of advertisement by Advertiser-A in FIG. 3B. In one embodiment, field 115 shows the list of online groups chosen, the advertisements selected, the durations of the advertisements, and the start/end dates of the advertisements. Field 115 provides an overall view for Advertiser-A of the advertisements placed by Advertiser-A.

In one embodiment, advertiser window 110 has a button 116 that allows Advertiser-A to view hits of run (or displayed) advertisements. Hits are number of clicks initiated by the users of the online groups selected by Advertiser-A, or impressions of the advertisements displayed to the users of the online groups selected. When Advertiser-A clicks on button 116, a window 126 of hit results appears, as shown in FIG. 3H. In window 126, there are hit results of various advertisements run by Advertiser-A to various online groups. The results can also be displayed in a graphical format, such as the graphical display of field 153. In field 153, the hit results are plotted against the days the advertisements are displayed. After viewing the results, Advertiser-A can close window 126 by clicking on a "Close" button 152.

Advertiser window 110 can also include a button 117 for viewing payment history. If Advertiser-A clicks on button, 117, a window 127 showing payment history would appear, as shown in FIG. 3I in accordance with one embodiment of the present invention. Window 127 contains time, payment and total hits of advertisements run by Advertiser-A. Advertiser-A can judge how successful the run advertisements are by viewing the data in window 127. Window 127 can have a "close" button 154, which allows Advertiser-A to close window 127 by clicking button 154.

As described above of FIG. 3A, the online group system 300 has a moderator window 120 of a moderator of the online group "ABC-EE-Alumni, on a client computer of the moderator. The moderators of the online groups can screen the advertisements before they are displayed on the online group media spaces (or web sites). Screening by the moderators further confirms the relevancy of the advertisements to the targeted online groups and further verifies if the online groups welcome the advertisements.

Figure 4A:
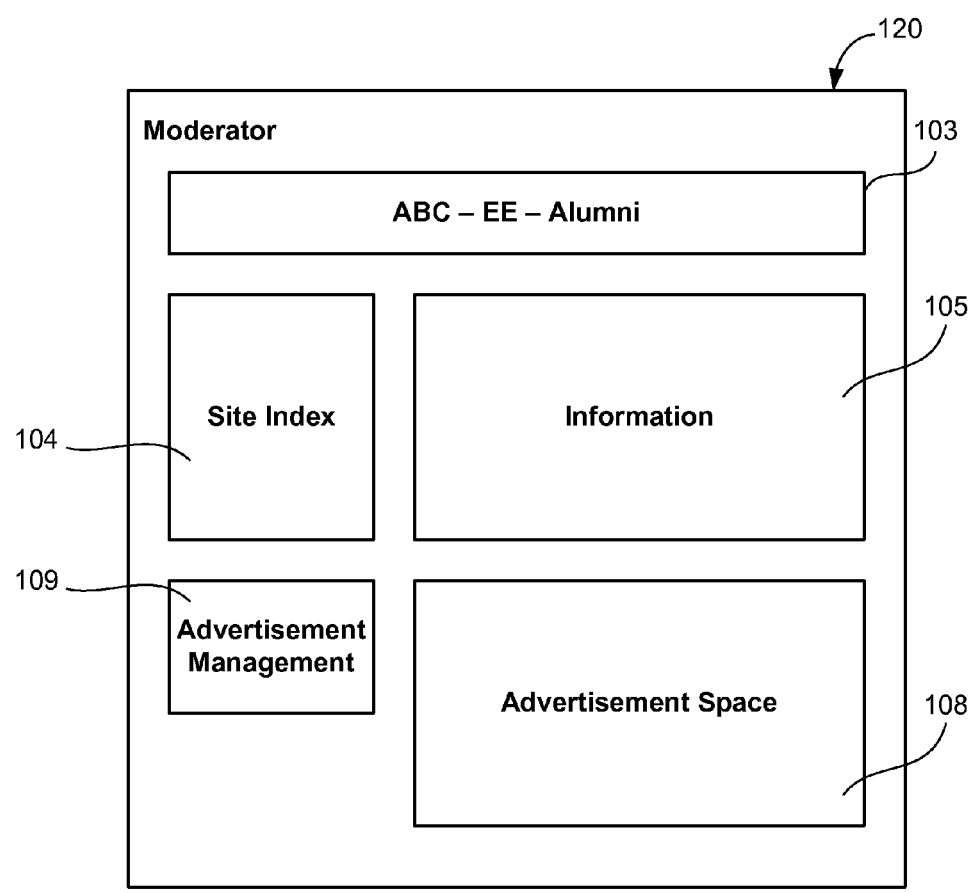
FIG. 4A shows a moderator window for a moderator of an online group, in accordance with one embodiment of the present invention.

In the example discussed below, the moderator of the online group "ABC-EE-Alumni" is also a member of the online group "ABC-EE-Alumni. The moderator window 120 has all the elements of a user window of the online group "ABC-EE-Alumni", such as the user window 102' of FIG. 2A. The moderator window 120 has additional elements that the user window does not have to allow the moderator to moderate the group activities. FIG. 4A shows a moderator window 120 for a moderator of online group "ABC-EE-Alumni" with the basic element of a user window 102' of "ABC-EE-Alumni" of FIG. 2A, in accordance with one embodiment of the present invention. In addition, the moderator window 120 has an additional button 109 for managing advertisements on "ABC-EE-Alumni" media space. When the moderator of the online group "ABC-EE-Alumni" clicks on button 109, a window 160 for managing advertisements on online group "ABC-EE-Alumni" appears, as shown in FIG. 4B in accordance with one embodiment of the present invention.

In window 160, there is a field 161 listing advertisements to be approved, as shown in FIG. 4B. In field 161, there are a number of advertisements to be approved by the moderator. The listing of advertisements could include hyperlinks to the advertisements, formats of the advertisements, start/end dates, and duration of the advertisements, etc. The moderator can click on the hyperlinks of the advertisements to view the contents of the advertisements. Afterwards, the moderator can check the "approved" box 162 before each advertisement to approve the advertisement to be display on the online group. Alternatively, if the moderator deems the content of a particular advertisement is not appropriate, the moderator can check the "reject" box 163 before each advertisement to prevent the advertiser of the particular advertisement from placing advertisements on the online group. The moderator can choose not to check on either the "approved" button 162 or the "reject" button 163. Under such a circumstance, the advertisement would not be displayed on the site; however, the advertiser is not rejected from the site. If the an advertiser has already paid for an advertisement that is not selected for display by the moderator, the payment associated with displaying the advertisement to the online group should be refunded.

Window 160 can also includes a button 164 of approved advertisements and advertisers, which allows the moderator to view a list of advertisements and advertisers that the moderator has approved. When the moderator clicks on button 164, a window 171 showing a list of approved advertisements and advertisers appears, as shown in FIG. 4C in accordance with one embodiment of the present invention.

Window 160 can also includes a button 165 of rejected advertisements and advertisers, which allows the moderator to view a list of advertisements and advertisers that the moderator has rejected. When the moderator clicks on button 165, a window 172 showing a list of rejected advertisements and advertisers appears, as shown in FIG. 4D in accordance with one embodiment of the present invention.

Further, window 160 can have a field 166 of allowed and disallowed (or barred) subjects of advertisements for the online group. For example, the moderator can add key words in a field 173 of allowed subject to add subject areas that the moderator considers relevant and interesting to the group members. In the example in FIG. 4B, the moderator of "ABC-EE-Alumni" lists jobs and trainings as areas relevant and interesting to the group. The moderator can also add key words in a field 174 of disallowed subject to add subject areas that the moderator considered not appropriate to the group. In the example shown in FIG. 4B, the moderator has listed advertisements in the areas of personals, and cars as irrelevant and disallows advertisements in these subject areas to the group.

Window 160 can also include a field 167 of advertising space on the online group for the moderator to decide how much and where the advertisement space is allowed on the online group site, as shown in FIG. 4B. As described above in FIGS. 2A and 2B, the advertisement space 108 could be at the bottom of the site, as shown in FIG. 2A, or near the top of the media space, as shown in FIG. 2B. In addition, the moderator can decide how much advertisement space to provide to the advertisers. The moderator can decide to give a lot of space or limited space. At an extreme, the moderator can also decide not to provide any space for advertisements targeted at the group. In the example shown in FIG. 4B, the moderator chooses the bottom area to display advertisements. The moderator also chooses "medium" advertisement space to display advertisement. The size of "medium" space is set by the online group system. The location of "top" and "bottom", and the size of "large", "medium", and "small" are merely examples. Other locations and selections of sizes are also possible.

Online groups provide web media spaces for members to communicate with members in their own groups. Members of an online group consider the web media space of their online group as their own space. As a result, online group systems, such as system 200, have moderators managing online group contents. Since moderators directly and members indirectly (by providing comments to the moderator) make decisions on what types of advertisements to allow and how much advertisement space to allow on the online group, providing financial incentives for the online group to allow advertisements would encourage the online group to allow advertisements in the online groups.

As discussed above, in order to display advertisements on online groups, advertisers, such as Advertiser-A, make payment to the companies or entities that own the online group systems, such as system 300. The companies or entities that own the online group systems make profits by installing systems described above to allow advertisements targeting online groups.

In one embodiment, a portion of profit made from an advertiser, such as Advertiser-A, to display an advertisement on an online group, such as "ABC-EE-Alumni", by a company that owns the online group system is shared with the online group "ABC-EE-Alumni". In the example shown in FIG. 3G, Advertiser-A pay $100 to the company that owns online group system 300 to display advertisements to three online groups, "ABC-EE-Alumni", "DEF-EE-Alumni", and "GHI-EE-Alumni". Out of the $100, $30 is used to pay for displaying advertisement "Ad-1" in "ABC-EE-Alumni" online group. The company that owns the online group system 200 could give a portion of the profit of $30, such as 10% (or $3), to "ABC-EE-Alumni" group.

Sharing a portion of the profit with the online group provides an incentive to the online group to allow advertisements to appear on their web media space. In one embodiment, the profit is given to the moderator as a reward for managing the content of the site and for screening the advertisements for the group. The moderator can decide what to do with the profit.

In one embodiment, window 160 has a profit window 168 that shows the profit made from allowing advertisements on the group media space (or web site). The amount (or portion) of profit that the company of the online group system is willing to share with the moderator (or the group) can be decided by many factors, such as the number of members, the number of hits, the location displaying the advertisement, and the size of the advertisement space, etc.

After viewing the advertisements displayed on the group media space, a user, such as USER-1, can give feedback regarding advertisements to the moderator of the online group. "Ad-1" EE job listing provided by Advertiser-A is displayed on "ABC-EE-Alumni" site, as shown in field 108 of FIG. 2A. FIG. 4E shows another embodiment of the advertisement space 108', which include advertisement rating and comment functions, in accordance with one embodiment of the present invention. At the bottom of FIG. 4E, there is a field 173 for rating and commenting the displayed advertisement. In the example of FIG. 4E, users of the online group "ABC-EE-Alumni", such as USER-1, can click on ratings from 1 to 5 (for example, 1 being very good and 5 being very bad). Users can also click on the link 174 to provide comments on the advertisements. In one embodiment, the results of the rating and comments are sent to the moderator of the group. Window 160 of advertisement management of the moderator includes a button 169 for viewing ratings and comments of displayed advertisements by users of the group, as shown in FIG. 4B. Moderator of "ABC-EE-Alumni" can click on button 169 to view the ratings and comments from users. In one embodiment, the ratings and/or comments by the users of "ABC-EE-Alumni" group are sent to Advertiser-A. Window 124 of placing advertisement for Advertiser-A has a button 148 to view ratings and comments of displayed advertisements by users of the group, as shown in FIG. 3F. Advertiser-A can click on button 148 to view the ratings and comments from users from various online groups that Advertiser-A has placed advertisements.

Figure 5A:
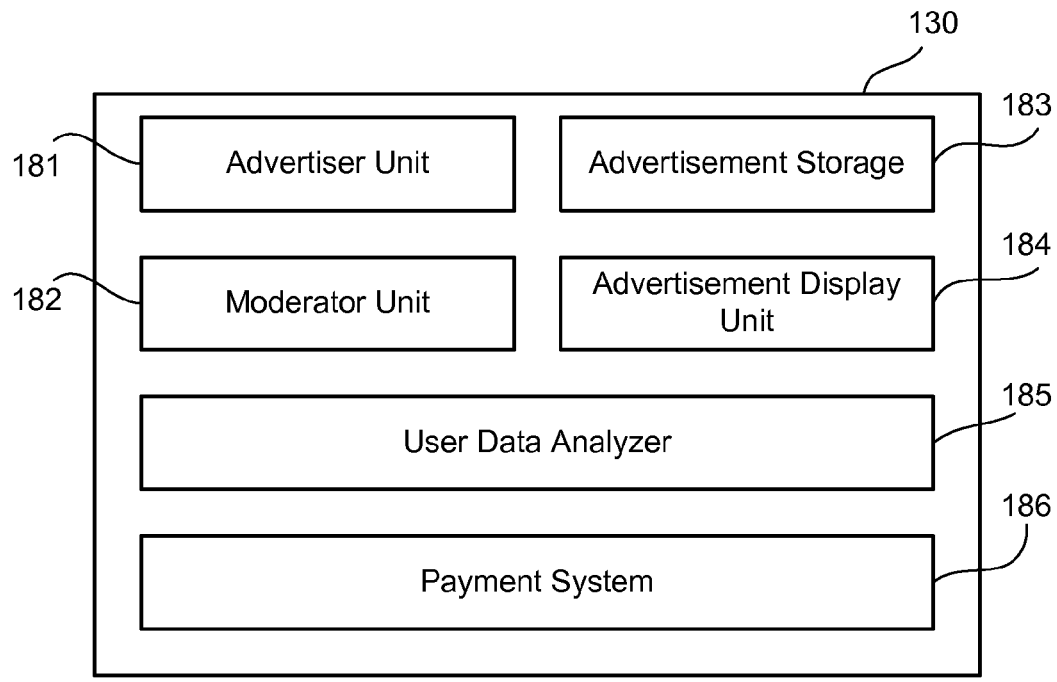
FIG. 5A shows an online group advertisement server including a number of units, in accordance with one embodiment of the present invention.

Based on the discussion above, the online group advertisement server 130 described in FIG. 3A has to handle quite a few functions to enable displaying of advertisements in targeted online groups. FIG. 5A shows an embodiment of an online group advertisement server 130, which include a number of units. The online group advertisement server 130 includes an advertiser unit 181, which collects inputs, analyzes inputs, and interacts with other units in the advertisement server 130 to prepare responses to requests from advertisers, in accordance with one embodiment of the present invention. For example, advertiser unit 181 interacts with other units and components in the online group advertisement server 130 to store advertisement, to collect user-viewing results, and to make payment. In one embodiment, the advertisements downloaded by the advertisers are stored in an advertisement storage 183 of the online group advertisement server 130. In addition to advertisements, advertisement storage 183 also stores identities of advertisers, the online groups that advertisers place advertisements, the start dates of advertisement, the end dates of advertisements, and the durations of advertisements. Other information related to advertisements could also be stored in the advertisement storage 183.

Online group advertisement server 130 also includes a moderator unit 182, which collects inputs, analyzes inputs, and interacts with other units of advertisement server 130 to prepare responses to requests from the moderators of various online groups, in accordance with one embodiment of the present invention. For example, moderator unit 182 interacts with other units and components in the online group advertisement server 130 to determine which groups would accept advertisements, what types of advertisement each group would accept or reject, which advertisers place which advertisements in what groups, etc. Moderator unit 182 works with an advertisement display unit 184 to pull advertisements stored in advertisement storage 183 to be displayed in selected online group media spaces. The advertisement display unit 184, in the online group advertisement server 130, interacts with the moderator units and advertisement storage to prepare advertisements displayed in various online groups, in accordance with one embodiment of the present invention.

In one embodiment, online group advertisement server 130 further has a user data analyzer 185, which collects and analyzes user hits on advertisements displayed in various online groups. The analyzed results can be passed to the advertiser unit 181 and moderator unit 182 to be displayed in the hit results window 126 of Advertiser-A of FIG. 3H. In one embodiment, the hit results for advertisements of an online group are prepared and displayed to the moderator of the group. In addition, the user data analyzer 185 collects and analyses ratings and comments from users and passes the information to the advertiser unit 181 and moderator unit 182 to display the results when requested.

Figure 5B:
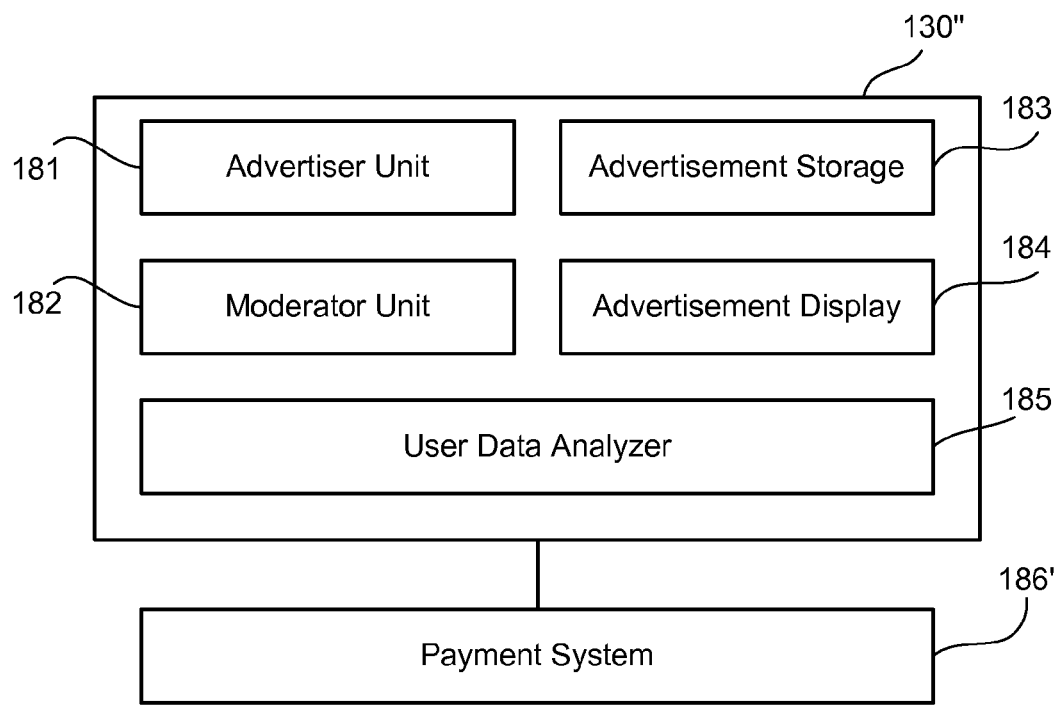
FIG. 5B shows an online group advertisement server and a payment system, in accordance with one embodiment of the present invention.

In addition, online group advertisement server 130 includes a payment system 186, which store pricing information for advertisement and interacts with the advertisement storage 183 to determine how much fee to charge each advertiser. The payment system 186 also interacts with the advertiser unit 181 to pass payment information of each advertiser to the advertiser unit 181 and to collect online payments from various advertisers. Alternatively, the payments can be collected offline in conventional manners, such as by regular mails. In the event the online group advertisement system 300 fails to display scheduled advertisements due to system problem, the payment system 186 also handles refunds or provides credits back to advertisers. Alternatively, the payment system can be separated from the online group advertisement server 130. For example, as shown in FIG. 5B, the online group advertisement server 130" and the payment system 186' are separated.

Figure 6:
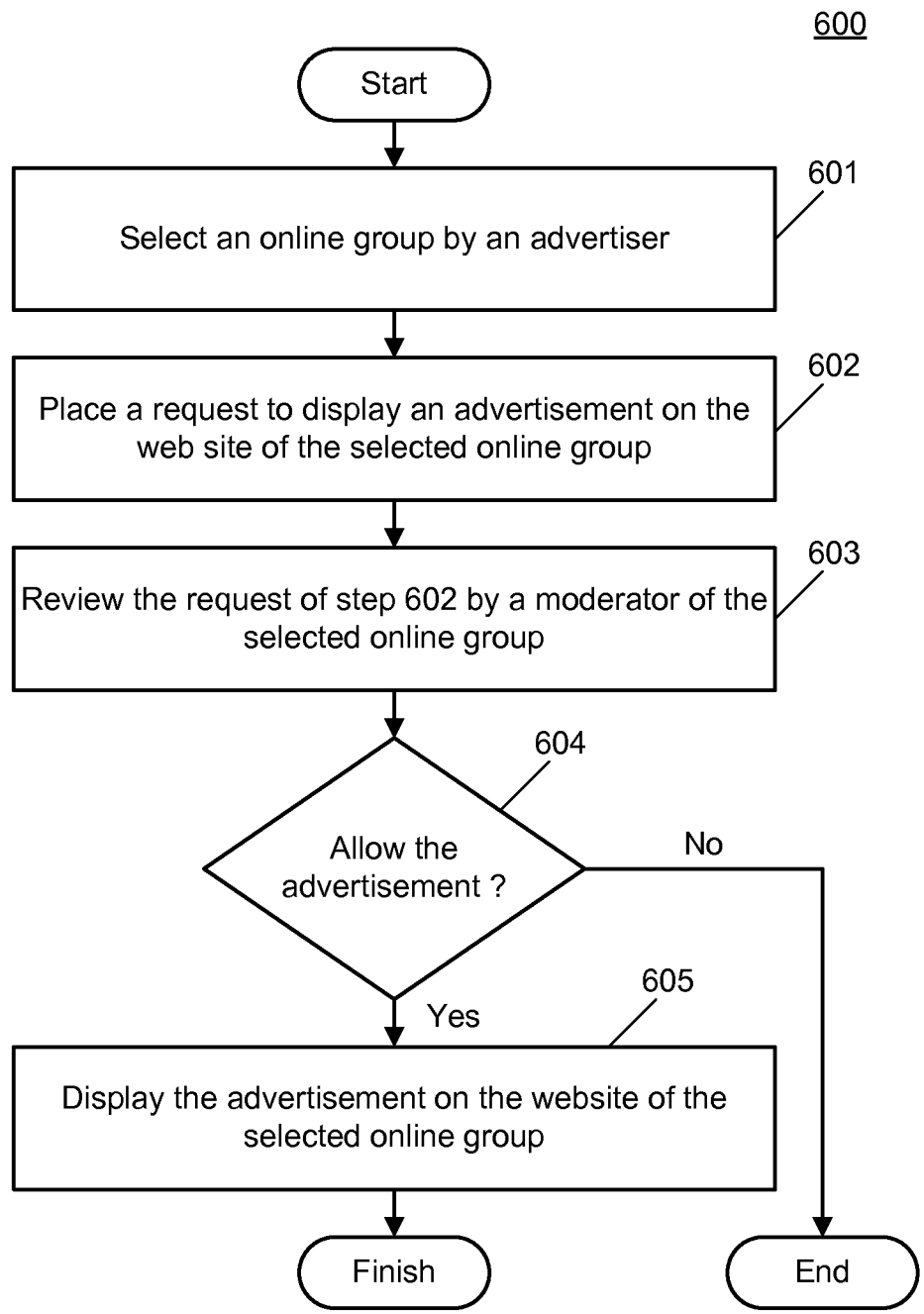
FIG. 6 shows a process flow of displaying an advertisement in an online group, in accordance with one embodiment of the present invention.

FIG. 6 shows an embodiment of a process flow 600 of displaying an advertisement in an online group. At step 601, an advertiser selects an online group(s) whose interest, focus or background matches the product(s) and/or service(s) provided by the advertiser. An on-line community group system, such as system 100, enables the selection of the online group by the advertiser. After the online group(s) is selected, the advertiser places a request to display an advertisement on the media space of the selected online group at step 602. An on-line community group system, such as system 100, receives the request from the advertiser. At step 603, a moderator of the online group reviews the request of step 602. An online community group system, such as system 100, enables review of the request by the moderator. At step 604, the moderator decides whether to allow the advertisement to be displayed at the media space of the online group. If the answer is "no", the advertisement is not displayed. If the answer is "yes', the advertisement is displayed on the media space of the online group at step 605.

The systems and methods discussed above are related to public online groups that allow general population to access the media spaces and to view the focus (or interest) descriptions, such as description field 106 of FIG. 1B, of the groups. These public groups can also be found by browsing through different categories of the online group home site. Since these groups are public, their focus descriptions are searchable, their focus descriptions are searchable. However, some online groups are private. In one embodiment, the moderators of private groups can allow the focus descriptions of their groups to become searchable by advertisers to allow advertisements to be placed in the groups in a manner similar to public groups.

Figure 7:
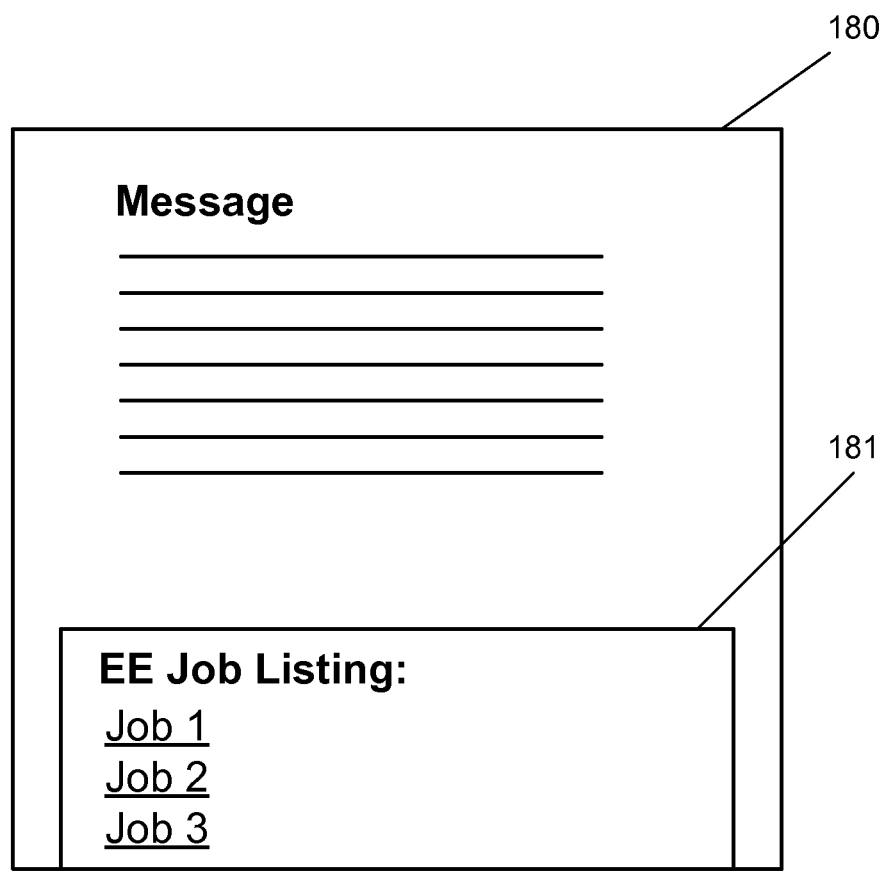
FIG. 7 shows a message posted by a member of an online group including a targeted advertisement, in accordance with one embodiment of the present invention

The systems and methods discussed above focus on displaying advertisements in the media spaces of the online groups. Members of online groups often post messages, which can be delivered as emails, to exchange information with the members of their online groups. In one embodiment, targeted advertisements can be displayed in the messages posted by members. As mentioned above, YAHOO!® GROUPS currently has roughly 8.5 million groups with about 106 million users. Each month, these YAHOO!® GROUPS deliver billions of emails to the users of these groups. Targeted advertisements displayed in the messages posted by members can reach a wide audience. FIG. 7 shows a message 180 posted by a member of an online group, which accepts targeted advertisements from advertisers, in accordance with one embodiment of the present invention. In the example shown in FIG. 7, the advertisement is attached at the end of the message in an advertisement field 181. Alternatively, the advertisement can be attached at other location of the message.

The systems discussed above can also be used by group members to send paid greetings to other group members. For example, in a health support online group, a member, such as Member A, buys an online greeting advertisement to wish another member, such as Member B, to get well soon in front of the whole group. Another example is a member of an online group sends an online birthday greeting to another member of the group in front of the whole group. The systems can be configured, in similar manners discussed above, to provide products or services, such as greeting cards, for members to purchase for other members. The products and services available for members to purchase for other members are not limited to greeting cards.

The concept of this invention can be applied to any on-line communities or groups with dedicated web communication spaces for members. With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter read by a computer system. The computer readable medium may also include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method of providing an advertisement for display in an advertisement space of an online group, comprising:
    enabling selection of the online group from a plurality of online groups by an advertiser based on a predefined focus of each of the online groups as provided in group focus descriptions in corresponding media spaces of the online groups, the plurality of online groups being formed on online social networking sites, wherein a focus of each online group is common to all members of the online group, the focus defining a common interest for the members of the online group, wherein goods or services promoted by the advertiser in the advertisement correlate to the common interest of the online group;
    receiving from a first client of the advertiser a request to display the advertisement in the advertisement space of an online group web site of the selected online group from the advertiser;
    sending the request including the advertisement to a second client of a moderator of the online group to enable review of the request to display the advertisement by the moderator to determine whether to allow the advertisement to be displayed in the advertisement space of the online group;
    displaying to members of the online group the advertisement in the advertisement space of the online group web site when receiving an approval instruction approving the advertisement from the second client in response to the request, the approval instruction indicating that the moderator allows the advertisement to be displayed;
    not displaying the advertisement when receiving a rejection instruction rejecting the advertisement from the second client in response to the request, the rejection instruction indicating that the moderator does not allow the advertisement to be displayed; and
    not displaying the advertisement when the approval instruction and rejection instruction are not received from the second client in response to the request, wherein method operations are performed by a processor.

2. The method of claim 1, wherein the selected online group is identified by the advertiser by searching focus descriptions of the plurality of online groups.

3. The method of claim 1, wherein the advertisement is selected from a plurality of advertisements by the advertiser.

4. The method of claim 1, further comprising:
    enabling uploading of the advertisement into a storage for advertisements for the plurality of online groups by the advertiser before the request to display the advertisement in the advertisement space of the online group web site is placed.

5. The method of claim 1, further comprising:
    enabling determination of a location and a size of the advertisement space in a media space of the online group web site by the moderator.

6. The method of claim 1, wherein the advertiser makes a payment required to display the advertisement while placing the request to display the advertisement.

7. The method of claim 1, further comprising:
enabling determination of subjects of advertisements to be allowed in the online group and subjects of advertisements to be barred from the online group by the moderator.

8. The method of claim 6, wherein a portion of the payment is given to the online group.

9. The method of claim 1, wherein the request to display the advertisement includes the advertisement to be displayed, a start date of displaying the advertisement, and an end date of displaying the advertisement.

10. The method of claim 1, wherein the plurality of online groups are managed by an online group system of one or more of the online social networking sites.

11. The method of claim 6, wherein the payment required to display the advertisement is affected by a duration and a start date of displaying the advertisement.

12. The method of claim 6, wherein the payment required to display the advertisement is refunded to the advertiser if the moderator determines not to allow the advertisement to be displayed.

13. The method of claim 1, further comprising:
enabling viewing of the advertisement by a member of the online group that is not the moderator, wherein the member rates and provides comments of the advertisement.

14. A computer system for displaying advertisements provided by advertisers to online groups of an online group system, comprising:
a processor;
advertisement storage for storing the advertisements;
an advertiser unit, wherein the advertiser unit collects inputs, analyzes inputs, and interacts with other units in the computer system to prepare responses to requests from the advertisers, the advertiser unit allowing advertisers to select online groups based on a group focus of each online group as provided in group focus descriptions in corresponding media spaces of the online groups, the online groups being formed on online social networking sites, wherein the group focus of each online group is common to all members of the online group, the group focus defining a common interest for the members of the online group, the advertiser unit allowing advertisers to place requests to display the advertisements on the media spaces of web sites of the selected online groups, the requests received from clients of the advertisers;
a moderator unit, wherein the moderator unit collects inputs, analyzes inputs, and interacts with other units in the computer system to prepare responses to requests from moderators of the online groups, and wherein the moderator unit allows moderators to review the requests to display the advertisements placed by the advertisers and decide whether to allow the advertisements to be displayed to members in the online groups moderated by the moderators, including receiving in response to a first request to display a first advertisement to a first online group from a first client of a first moderator associated with the first online group an approval instruction approving the first advertisement to be displayed, and receiving in response to the first request from the first client a rejection instruction disallowing the first advertisement to be displayed; and
an advertisements display unit, wherein the advertisement display unit interacts with the moderator unit and the advertisement storage to display the advertisements allowed to be displayed by the moderators in the web sites of the online groups they moderate, wherein the first advertisement is displayed to the first online group when receiving the approval instruction from the first client in response to the first request, wherein the first advertisement is not displayed to the first online group when receiving the rejection instruction from the first client in response to the first request, and wherein the first advertisement is not displayed to the first online group when the approval instruction and the rejection instruction are not received from the first client in response to the first.

15. The computer system of claim 14, further comprising:
an advertisement storage, wherein the advertisement storage stores the advertisements provided by the advertisers.

16. The computer system of claim 15, wherein the advertisement storage stores an start date, an end date, an identity of an advertiser, and an identity of an online group where an advertisement is to be displayed for each advertisement stored in the advertisement storage.

17. Non-transitory computer readable media including program instructions for providing an advertisement for display in an advertisement space of an online group, comprising:
program instructions for enabling selection of the online group from a plurality of online groups by an advertiser based on a predefined focus of each of the online groups as provided in group focus descriptions in corresponding media spaces of the online groups, the plurality of online groups being formed on online social networking sites, wherein a focus of each online group is common to all members of the online group, the focus defining a common interest for the members of the online group, wherein goods or services promoted by the advertiser in the advertisement match the common interest of the online group;
program instructions for receiving from a first client of the advertiser a request to display the advertisement in the advertisement space of an online group web site of the selected online group from the advertiser;
program instructions for sending the request including the advertisement to a second client of a moderator of the online group to enable review of the request to display the advertisement by the moderator to determine whether to allow the advertisement to be displayed in the advertisement space of the online group;
program instructions for receiving from a first client of the advertiser a request to display the advertisement in the advertisement space of an online group web site of the selected online group from the advertiser;
program instructions for displaying to members of the online group the advertisement in the advertisement space of the online group web site when receiving an approval instruction approving the advertisement from the second client in response to the request, the approval instruction indicating that the moderator allows the advertisement to be displayed
program instructions for not displaying the advertisement when receiving a rejection instruction rejecting the advertisement from the second client in response to the request, the rejection instruction indicating that the moderator disallows the advertisement to be displayed; and program instructions for not displaying the advertisement when the approval instruction and rejection instruction are not received from the second client in response to the request.

18. The computer readable media of claim 17, further comprising:

program instructions for enabling uploading of the advertisement into a storage for advertisements for the plurality of online groups by the advertiser before the request to display the advertisement in the advertisement space of the online group web site is placed.

19. The computer readable media of claim 17, further comprising:

program instructions for enabling determination of a location and a size of the advertisement space in a media space of the online group by the moderator.

20. The computer readable media of claim 17, further comprising:

program instructions for enabling determination of subjects of advertisements to be allowed in the online group and subjects of advertisements to be barred from the online group by the moderator.

21. The computer readable media of claim 17, further comprising:

program instructions for enabling viewing of the advertisement by a member of the online group, wherein the member is not the moderator, and the member rates and provides comments of the displayed advertisement.

* * * * *